(12) United States Patent
Ott

(10) Patent No.: US 10,317,286 B2
(45) Date of Patent: Jun. 11, 2019

(54) LUMINAIRE AND METHOD FOR TEMPERATURE CONTROL

(71) Applicant: Eaton Protection Systems IP GmbH & Co. KG, Schönefeld (DE)

(72) Inventor: Toni Ott, Neckargemund (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 15/100,253

(22) PCT Filed: Sep. 10, 2014

(86) PCT No.: PCT/EP2014/002452
§ 371 (c)(1),
(2) Date: May 27, 2016

(87) PCT Pub. No.: WO2015/078537
PCT Pub. Date: Jun. 4, 2015

(65) Prior Publication Data
US 2016/0377484 A1 Dec. 29, 2016

(30) Foreign Application Priority Data
Nov. 29, 2013 (DE) .......... 10 2013 018 120

(51) Int. Cl.
*F21V 23/04* (2006.01)
*H05B 33/08* (2006.01)
(Continued)

(52) U.S. Cl.
CPC .......... *G01J 5/041* (2013.01); *F21V 9/00* (2013.01); *F21V 23/0457* (2013.01); *F21V 25/10* (2013.01); *F21V 29/50* (2015.01); *G01J 5/047* (2013.01); *G01J 5/10* (2013.01); *G01J 5/60* (2013.01); *H05B 33/0842* (2013.01);
(Continued)

(58) Field of Classification Search
None
See application file for complete search history.

(56) References Cited

U.S. PATENT DOCUMENTS 4,956,538 A * 9/1990 Moslehi ............... G01J 5/0003
219/121.6
5,334,916 A * 8/1994 Noguchi ............... H01L 24/45
315/309
(Continued)

FOREIGN PATENT DOCUMENTS

CN 102597617 7/2012
DE 3716251 12/1988
(Continued)

OTHER PUBLICATIONS

Machine translation of DE 102010005088A1, via LexisNexis Total Patent, 5 pages.
(Continued)

*Primary Examiner* — Minh D A
*Assistant Examiner* — James H Cho
(74) *Attorney, Agent, or Firm* — King & Spalding LLP

(57) ABSTRACT

A luminaire comprises at least one light emitting diode (LED) as a light source. Such LED has a limited light emitting angle for emitted light radiation. An infrared sensor is assigned to the light source for determining the temperature of same.

18 Claims, 1 Drawing Sheet

(51) Int. Cl.
*G01J 5/04* (2006.01)
*G01J 5/10* (2006.01)
*G01J 5/60* (2006.01)
*F21V 29/50* (2015.01)
*F21V 9/00* (2018.01)
*F21V 25/10* (2006.01)
*H05B 37/02* (2006.01)
*F21Y 115/10* (2016.01)

(52) U.S. Cl.
CPC ...... *H05B 37/0227* (2013.01); *F21Y 2115/10* (2016.08); *G01J 2005/608* (2013.01)

(56) References Cited

U.S. PATENT DOCUMENTS

| | | | |
|---|---|---|---|
| 9,265,119 B2* | 2/2016 | Catalano | H05B 33/0884 |
| 2006/0192125 A1 | 8/2006 | Yoganandan et al. | |
| 2007/0045524 A1* | 3/2007 | Rains, Jr. | F21K 9/00 |
| | | | 250/228 |
| 2008/0062404 A1 | 3/2008 | Kawano et al. | |
| 2008/0157698 A1 | 7/2008 | Tan et al. | |
| 2009/0072119 A1 | 3/2009 | Park et al. | |
| 2009/0302766 A1* | 12/2009 | Behr | B60Q 1/0023 |
| | | | 315/82 |
| 2010/0084979 A1 | 4/2010 | Burton et al. | |
| 2010/0148702 A1* | 6/2010 | Shen | G09G 3/3406 |
| | | | 315/309 |
| 2011/0191058 A1* | 8/2011 | Nielsen | B65D 83/203 |
| | | | 702/130 |
| 2011/0211351 A1* | 9/2011 | Van De Ven | F21V 23/005 |
| | | | 362/249.02 |
| 2013/0082616 A1 | 4/2013 | Bradford et al. | |
| 2013/0181611 A1* | 7/2013 | Pan | H05B 33/0851 |
| | | | 315/151 |

FOREIGN PATENT DOCUMENTS

| | | |
|---|---|---|
| DE | 10031303 | 1/2002 |
| DE | 102004060890 | 6/2006 |
| DE | 102010005088 | 7/2011 |
| EP | 0516398 | 12/1992 |

OTHER PUBLICATIONS

Machine translation of DE 102004060890A1, via LexsisNexis Total Patent, 17 pages.
Machine translation of DE 10031303A1, via LexsisNexis Total Patent, 9 pages.
Machine translation of DE 3716251A1, via LexsisNexis Total Patent, 6 pages.
Schmidt, Charlotte, International Search Report issued in International Patent Application PCT/EP2014/002452, completion date Nov. 19, 2014, dated Nov. 28, 2014, 6 pages, European Patent Office.
Xiang, Zhou et al, Communications Real-Time Observation of Temperature Rise and Thermal Breakdown Processes in Organic LEDs Using an IR Imaging and Analysis System**, Advanced Materials, Dec. 31, 2004, 5 pages, vol. 12, No. 4, URL: http//www.physics.fudan.edu.cn/tps/people/xyhou/papers/AM12_00265.
Chinese Office Action issued in Application No. 201480065260.5, dated Jul. 31, 2018, 8 pages, The State Intellectual Property Office of the People's Republic of China.
Translation of Chinese Office Action issued in Application No. 201480065260.5, 6 pages.
Machine translation of CN102597617 via LexisNexis Total Patents, 15 pages.

* cited by examiner

LUMINAIRE AND METHOD FOR TEMPERATURE CONTROL

PRIORITY CLAIM

The present application is national phase application of and claims priority to International Application No. PCT/EP2014/002452 with an International filing date of Sep. 10, 2014, which claims priority to German Patent Application No. 10 2013 018 120.8, filed on Nov. 29, 2013. The foregoing applications are hereby incorporated herein by reference.

TECHNICAL FIELD

The invention pertains to a luminaire with at least one LED (light emitting diode) as a light source. Such a LED has a limited light ray angle for emitted light radiation.

BACKGROUND

The invention pertains to a luminaire with at least one LED (light emitting diode) as a light source. Such a LED has a limited light ray angle for emitted light radiation.

The corresponding angle for a LED is for example 15° to 220°, wherein the angle is generally fixed by a small lens structure of the LED. With respect to such light sources, it has to be considered that the efficiency of an LED is in fact relatively high, whereby, for example, a maximum of just 20% of the applied energy is in fact converted to visible light. It is a further characteristic of LEDs that the produced usable spectrum by such conversion is very narrow and there will be no portion of the radiation in the infrared area. The rest of the applied energy will be converted into heat. To avoid any damage of the LED by such produced heat, this heat will be discharged by a cooling body, active cooling, liquid cooling or the like. Otherwise, the lifespan of the LED and also its light production will be negatively influenced or reduced by the high heat impact. In general it can be said, that at temperatures of 120° C. or higher the corresponding semiconductor crystal of the LED will be damaged and will result in lasting drawbacks with respect to lifespan, light color, light production and further drawbacks to the LED. Such radiation angle refers to an angle of the light cone emitted by the light source, which can be used for efficient lighting and is also called effective luminous flux.

SUMMARY

It is an object of the present invention, to render possible a temperature control of the LED to avoid corresponding damage in a contact free way. Particularly advantageous is the arrangement of the corresponding sensor according to the selected and spectral dependant method into the effective luminous flux of the LED.

This object is accomplished by the features of claim 1 and, respectively, by the features of claim 10.

According to the invention the luminaire comprises an infrared sensor within the light emitting angle or effective luminous flux of the luminaire, in which the sensor is assigned to the light source for a contact-free determination of the temperature thereof.

According to the method, such infrared sensor is arranged within the effective luminous flux of the light source, a heat radiation of the light source is measured by such infrared sensor, and the infrared sensor signal is evaluated for a temperature determination of the light source.

Due to the arrangement of the infrared sensor within the corresponding effective light flux, it is possible, within the corresponding radiation zone, to directly detect heat radiation emitted by the light source with respect to visible light.

It has to be considered, that by heating a general body the so called black-body radiation is produced, which has a very characteristic spectrum, which only depends on the temperature of the corresponding body. Below 600° C. the black-body radiation is in the infrared zone of the spectrum and is not visible. Moreover, such black-body radiation is emitted in a broad area which is bigger than the corresponding light emitting angle. Theoretically, the black-body radiation is emitted in the total space around the corresponding heated body.

In general, there is a cooling body or the like arranged on the side of the light source opposite to the light emitting direction, such that the infrared sensor may be arranged on the other side of the light emitting direction. In this way it is ensured that heat radiation of the light source can be detected without an influence of the cooling body.

As a rule, the corresponding luminaire does not comprise only one LED, but several of such light sources. This means, a corresponding light source according to the invention may be a LED-spotlight, a LED-spot, a LED-strip, a LED-luminous row or the like. It might be sufficient in this respect, if only one LED of the LEDs is monitored by means of the infrared sensor. It is also feasible that two or more infrared sensors are distributed around the light source which might, for example, comprise a plurality of LEDs.

If you allow a direct evaluation of the heat radiation within the luminaire or at least close to the luminaire, the corresponding infrared sensor can be connected with an evaluation/control device for the determination of temperature and control of the light source. This means, that such evaluation/control device can determine temperature from a corresponding infrared signal, can possibly display the temperature or transfer it to a remote location. Moreover, such an evaluation/control device may also be used for the control of the light source. Such a control might be of advantage, if the evaluation/control device has a maximum temperature limit as a cutoff value. If a temperature is determined higher than the maximum temperature limit during temperature determination, corresponding information is transmitted which, for example, results in a switching off of the light source or the complete luminaire by a suitable actuator. In this context it should be also noted that an increase in temperature of the light source can also take place in absence of its operation, for example if the luminaire and, in particular, the light source is exposed to external radiation, such as solar radiation. For example in summer it was detected for corresponding exterior lights that solar radiation alone could cause temperatures to exceed 70° C. Also, by measurement of such temperatures, forced cooling or reduction of power dissipation of the light source or the complete luminaire can be, for example, initiated by the evaluation/control device.

In connection with such solar radiation, it may prove to be a disadvantage that the infrared sensor not only detects the heat of the light source, but also ambient heat. To prevent this, the infrared sensor can be shielded from ambient heat radiation.

As the infrared sensor is placed directly in the light emitting area of the light source, a heating of the infrared sensor by the visible light should be avoided. This can be done by an appropriate shielding In the form of dichroic mirrors or filters. Such are also called cold light filters or mirrors as they reflect visible light but allow infrared radiation through.

The dichroic mirrors or filters may be arranged as a dichroic glass or quartz and also as corresponding dichroic layers.

Further means for considering such ambient heat radiation might be to assign a second infrared sensor to the infrared sensor for detecting and compensating such ambient heat radiation. This means, the second infrared sensor is, in particular, directed to the environment and detects in particular the ambient heat radiation arriving at the luminaire or the light source, as for example by solar radiation.

This radiation will be detected and used for compensation of the temperature measurement of the light source by the other infrared sensor.

In this context it is further possible that a weighing of the measurements of the heat radiation detected by the infrared sensor assigned to the light source and the infrared sensor assigned to the environment takes place, which would take into account, for example, the sunlight-dependent or otherwise changing ambient temperature.

With respect to the method it is further said, that correspondingly to the comments said forth above, the switching off of the light source may be executed in particular by the evaluation/control device, when the measured temperature value is higher than a predetermined maximum temperature threshold value. Alternatively, the power may be adapted until an admissible value of the heat radiation is detected. An erroneous function of the LED may be recognized, if for example the emitted light spectrum is in a divergent ratio to the infrared spectrum at a particular ambient temperature.

Moreover, a corresponding screening of the infrared sensor with respect to ambient heat radiation may, for example, be reached by a cooling or the like. In some cases it may be sufficient, to just arrange a corresponding foil.

It might further be of advantage, if at least one of the infrared sensors used is arranged in an adjustable way. This means, it can, for example, be assigned to another light source or it might be varied in its orientation with respect to the light source, if this is caused by the temperature distribution within the luminaire, generation of heat by different sources or also by external heat radiation.

This is of course also possible for all used infrared sensors.

BRIEF DESCRIPTION OF THE DRAWINGS

In the following advantageous example of the invention, it is further described with respect to the figures.

DETAILED DESCRIPTION OF EXAMPLE EMBODIMENTS

Figure 1:
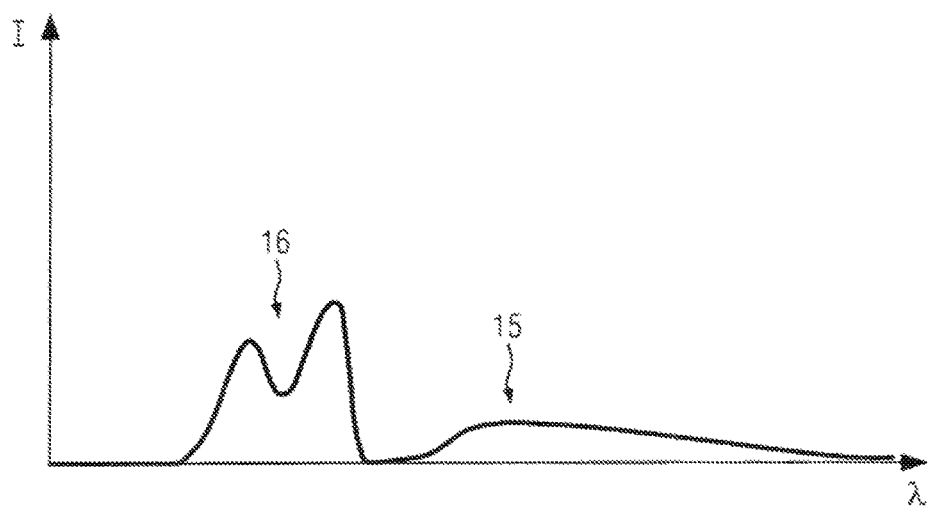
FIG. 1 is a diagram for illustrating the intensity and dependence of wave length for light radiation and temperature radiation.

In FIG. 1 a diagram for illustrating the intensity in the dependency of wave length for light radiation, see reference numeral 14, and heat radiation, see reference numeral 15. The light radiation for LEDs is mainly in the area of the visible light, which means the light radiation has a wave length in a region of approximately 480 nm to 680 nm. The corresponding spectral distribution may in particular cover a different region of the spectrum distribution of the visible light depending on the type of LEDs used and its light color. The corresponding heat radiation is, see also the comment above, in the infrared area and has for example at a body temperature of 297° C. an intensity maximum at a wave length of 5 µm. In any case, the corresponding wave length for the temperatures considered according to the invention is in the infrared area.

The used infrared sensor may have highest maximum sensitivity in the corresponding infrared area, wherein for screening of light rays emitted by the light source corresponding dichroic filters or mirrors, that is so called cold light filters or mirrors, may be used, which are preceded by the infrared sensor in direction to the light source. Those are relatively small dimensions with in an analogous way to the infrared sensor, such that no or negligible impairment of the light output of the corresponding luminaire is caused both by the arrangement of the infrared sensor and by the use of such dichroic filters/mirrors. Alternatively the infrared sensor may be a 2-ray or proportion-pyrometer, which can measure a shift of the infrared distribution and can thus determine the heating in a more exact way.

Figure 2:
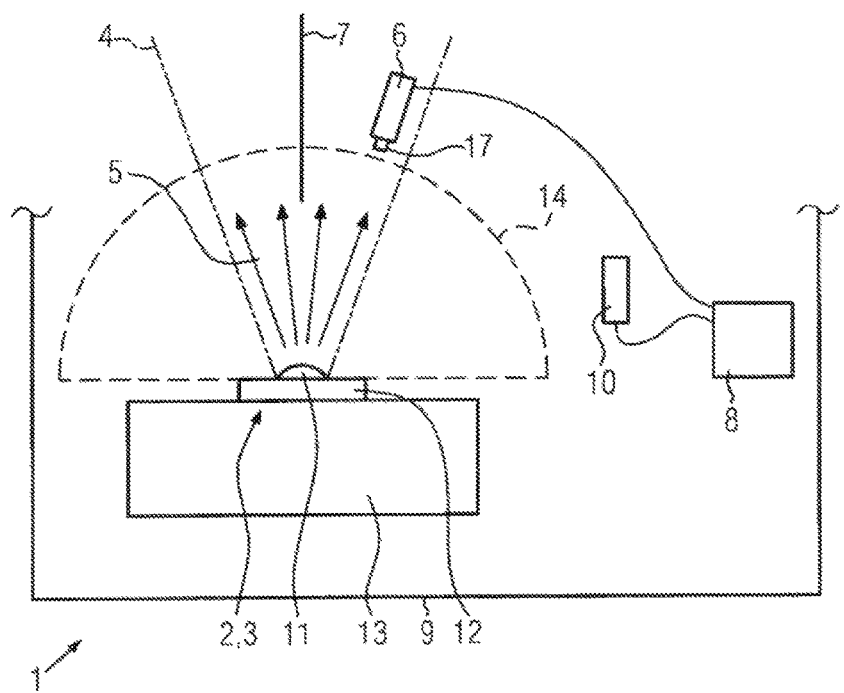
FIG. 2 is a principle illustration of a luminaire with infrared sensor according to the present invention.

In FIG. 2 a partial section of a luminaire 1 is shown with a temperature determination of the light source according to the invention. The luminaire 1 is illustrated with a luminaire housing 9 and a light source 3 arranged therein. For example, a corresponding light exit opening of the the luminaire or of the luminaire housing is not illustrated However this can be arranged in a conventional manner in the direction of the light rays emitted by the light source 3. Furthermore, in FIG. 1 only one light source in the form of a light emitting diode (LED) 2 is illustrated. It goes without saying, that a plurality of such LEDs can be arranged in form of a stripe or a ribbon.

The LED 2 in general includes a printed circuit board 12 with the corresponding semiconductor and a lens device 11 for dissipation or collection of the emitted light. By the LED 2 corresponding light rays 5 are emitted in a particular space area, which is defined by the illustrated radiation angle 4. This is dependent on the LED and corresponding lens device 11 for example between 15° and 120°. By such corresponding radiation angle 4 a medium emitting direction 7 is determined, which in general perpendicularly extends from the light source 3.

Through usage of the light source also from radiation of the light source from external sources, see for example solar radiation, the temperature of the LED will increase. In this respect it has to be considered that, for example, the light flux amount of a LED is strongly dependent on the barrier layer temperature. As the temperature increases, the light flux and lifespan are reduced and also a change in light colour may result. For corresponding cooling, a cooling device 13 is assigned to the LED, which can optionally be implemented by means of a ribbed cooling body, an active cooling system with cooling liquid or the like. As the LED is heated, it corresponds to a black-body which emits a corresponding black-body radiation caused by the heating in addition to the actual light radiation. Such a black-body radiation has a very characteristic spectrum, see FIG. 1, which only depends on the temperature of the corresponding body.

An infrared sensor 6 is assigned to the light source 2 according to the invention, which detects such black-body radiation in the infrared area.

By the arrangement of the cooling device 13 the corresponding black-body radiation, which corresponds to the temperature of the light source 2, is only emitted in the upper half-space above the cooling device 13, see here reference numeral 14, which designates the emitting angle of the black-body radiation.

In the area of this emitting angle the corresponding infrared sensor 6 is arranged, such that the temperature of the light source 2 can be detected by this sensor.

The infrared sensor 6 is arranged in such a way that it is located in the emitting area of the black-body radiation, that is, the heat radiation, and also in the area of the light radiation, see the corresponding emitting angle 4. Advantageously, the corresponding arrangement of the infrared sensor 6 will be at boundaries of the emitting angle 4.

The infrared sensor 6 is connected to an evaluation/control means 8. By this means the corresponding infrared sensor signals are received and converted into temperature values. The corresponding temperature values are in particular compared to a maximum temperature threshold. If the detected temperature of the light source 2 is higher than this maximum temperature threshold, the luminaire and in particular the light source may be switched off by the evaluation/control means.

It has already been said that such light source 2 may also be passively heated by radiation from the outside, for example solar radiation. This heating might influence the light source, such that its operation is jeopardized. Also in such a case, the temperature can be detected by the infrared sensor 6 and if deemed necessary, an active cooling of the light source may be initialized by the evaluation/control means.

The external heat radiation corresponding to an ambient temperature radiation must be shielded or considered in the temperature measurement of the light source. In an attempt to prevent such ambient heat radiation it is for example possible to shield the sensor 6 with the use of a covering, or foil, a cooling body or the like. This will ensure that the ambient temperature radiation will not directly reach the infrared sensor 6. For screening of light radiation from light source 2,3 a dichrotic filter or dichrotic mirror 17 is arranged between the light source and the infrared sensor 6. Such filter or mirror reflects visible light and allows infrared radiation to be transmitted to the infrared sensor 6.

It is also possible, that such ambient temperature radiation is detected by a second infrared sensor 10. This in particular is directed to the ambient heat radiation and detects same. The measurement values of both infrared sensors 6 and 10 can then be used for compensation of the ambient heat radiation in determining the temperature of the light source. Both infrared sensors transfer corresponding sensor values to the evaluation/control device 8.

It also has to be considered, that in FIG. 1 essentially just one light source is illustrated, as well as only one infrared sensor 6 or infrared sensor 10, respectively. Of course, it is also possible to use several light sources with only one infrared sensor 6 or also in combination with several of such infrared sensors 6. This is also valid for the second infrared sensor 10, such that it is also possible to use with several other sensors in order to detect ambient heat radiation coming from different areas.

According to the invention reliable determination of temperature of the corresponding light source occurs, to avoid for example any overheating. This means the light emission, lifespan, and also light color will be protected with respect to adverse effects due to overheating of the light source. Such a temperature measurement is of particular advantage in hazardous areas in order to prevent ignition by the overheated light source.

The invention claimed is:

1. A luminaire with at least one light emitting diode (LED) as a light source, which LED has a limited light emitting angle for emitted light rays, wherein within the limited light emitting angle an infrared sensor for determining a temperature of the light source is assigned to the light source, and wherein a second infrared sensor is assigned to the infrared sensor for detecting and compensating for an ambient heat radiation.

2. The luminaire according to claim 1, wherein the infrared sensor is located in a peripheral area of a light cone or efficient light flux and is directed toward the light source.

3. The luminaire according to claim 1, wherein the light source is an LED-spotlight, an LED-stripe, or an LED-illumination ribbon.

4. The luminaire according to claim 1, wherein the infrared sensor is connected to an evaluation/control device, wherein the evaluation/control device is configured to determine the temperature of and control the light source.

5. The luminaire according to claim 4, wherein the evaluation/control device includes a maximal temperature threshold as a preset switch off value.

6. The luminaire according to claim 1, wherein the infrared sensor is arranged in a luminaire housing.

7. The luminaire according to claim 1, wherein the infrared sensor is arranged in an adjustable way.

8. The luminaire according to claim 1, wherein the infrared sensor is a ratio or 2-ray-pyrometer.

9. The luminaire of claim 1, wherein after measurement of a preset temperature, a power reduction of the luminaire is performed to reduce the temperature.

10. A luminaire with at least one light emitting diode (LED) as a light source, which LED has a limited light emitting angle for emitted light rays, wherein within the limited light emitting angle an infrared sensor for determining a temperature of the light source is assigned to the light source, wherein the infrared sensor is shielded from an ambient heat radiation and/or visible light radiation of the light source using a screening device.

11. The luminaire according to claim 10, wherein the screening device has several parts including a reflector and/or a dichrotic mirror or filter.

12. A method for temperature control of an LED as a light source of a luminaire comprising of following steps:
    i) arranging of an infrared sensor within a light emitting angle of the light source;
    ii) measuring a heat radiation of the light source by the infrared sensor; and
    iii) evaluating an infrared signal for temperature determination of the light source, characterized in that in step iii) the temperature determination is realized by determination of deviations in a relation of emitted light spectrum to infrared spectrum at a particular ambient temperature.

13. The method according to claim 12, characterized by the further step of:
    switching off the light source, in case a temperature value determined in step iii) is higher than the preset maximum temperature threshold.

14. The method according to claim 12, characterized by a further step of:
    screening the infrared sensor with respect to an ambient heat radiation and/or light radiation of the light source.

15. The method according to claim 12, characterized by the further step of:
    measuring of an ambient heat radiation by a second infrared sensor for compensation of an ambient temperature.

16. The method according to claim 12, characterized by the further step of:

assigning of the infrared sensor to an LED-spotlight, an LED-strip, or an LED-ribbon as the light source.

17. The method according to claim 12, characterized in that for temperature determination deviation of an infrared distribution is measured.

18. The method of claim 12, further comprising: reducing the power usage of the light source, when a temperature value determined in step iii) passes a preset maximum temperature threshold, until a preset cooling temperature value is reached.

* * * * *